(12) United States Patent
Mestha et al.

(10) Patent No.: US 6,934,053 B1
(45) Date of Patent: Aug. 23, 2005

(54) METHODS FOR PRODUCING DEVICE AND ILLUMINATION INDEPENDENT COLOR REPRODUCTION

(75) Inventors: Lingappa K. Mestha, Fairport, NY (US); Sohail A. Dianat, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,586

(22) Filed: Jan. 19, 2000

(51) Int. Cl.$^7$ ............................. H04N 1/56; H04N 1/60

(52) U.S. Cl. ..................... 358/1.9; 358/504; 358/523

(58) Field of Search ..................... 358/1.9, 518, 504, 358/523, 501, 520, 521, 406, 530; 382/167, 312

(56) References Cited

U.S. PATENT DOCUMENTS

| | | | |
|---|---|---|---|
| 4,959,669 A | | 9/1990 | Haneda et al. ............... 346/157 |
| 5,200,816 A | | 4/1993 | Rose ........................... 358/80 |
| 5,339,176 A | | 8/1994 | Smilansky et al. .......... 358/504 |
| 5,357,448 A | | 10/1994 | Stanford ...................... 364/526 |
| 5,452,111 A | * | 9/1995 | Giorgianni et al. .......... 358/504 |
| 5,481,380 A | * | 1/1996 | Bestmann .................... 358/504 |
| 5,502,799 A | * | 3/1996 | Tsuji et al. ................... 345/600 |
| 5,612,902 A | * | 3/1997 | Stokes ......................... 364/526 |
| 5,664,072 A | * | 9/1997 | Ueda et al. ................... 395/109 |
| 5,671,059 A | * | 9/1997 | Vincent ........................ 356/402 |
| 5,708,916 A | * | 1/1998 | Mestha ......................... 399/49 |
| 5,771,311 A | | 6/1998 | Arai ............................. 382/162 |
| 5,809,213 A | | 9/1998 | Bhattacharjya ............. 395/106 |
| 5,877,787 A | * | 3/1999 | Edge ............................. 347/19 |
| 5,903,712 A | * | 5/1999 | Wang et al. .................. 358/1.9 |

(Continued)

FOREIGN PATENT DOCUMENTS

| | | | |
|---|---|---|---|
| EP | 0 491 131 A1 | 6/1992 | ............. G01J/3/51 |
| EP | 0582997 A1 | 2/1994 | ............. H04N/1/46 |
| EP | 0 625 847 A1 | 11/1994 | ............. H04N/1/46 |
| EP | 0 811 829 A2 | 12/1997 | |
| EP | 0868074 A1 | 9/1998 | ............. H04N/1/60 |
| EP | 0 915 615 A2 | 5/1999 | ............. H04N/1/60 |
| WO | WO 97/34409 A2 | 9/1997 | |

OTHER PUBLICATIONS

Berns, R.S. "Spectral Modeling of a Dye Diffusion Thermal Transfer Printer", Journal of Electronic Imaging, vol. 2, No. 4, Oct. 1993, pp. 359–370.

U.S. Appl. No. 09/487,587, filed Jan. 19, 2000, Yao Wang et al.

U.S. Appl. No. 09/221,996, filed Dec. 29, 1998, Lingappa K. Mestha et al.

U.S. Appl. No. 10/248,387, filed Jan. 15, 2003, Lalit K. Mestha et al.

U.S. Appl. No. 09/461,042, filed Dec. 15, 1999, Lingappa K. Mestha et al.

U.S. Appl. No. 09/566,291, filed May 5, 2000, Mestha et al.

Bens, R.S.: "*Spectral modeling of a Dye Diffusion Thermal Transfer Printer*", Journal of Electronic Imaging, vol. 2, No. 4, Oct. 1993, pp. 359–370.

*Primary Examiner*—Scott A. Rogers
(74) *Attorney, Agent, or Firm*—Oliff & Berridge, PLC

(57) ABSTRACT

Spectrally matched color outputs are obtained using data from a real-time sensor, such as, for example, a spectrophotometer on the output trays of a marking devices to determine the output spectra of a reproduced image. The output spectra of the reproduced image is compared with an output spectra of a target spectra stored in a computer memory to produce a mapping table that will spectrally match all subsequently reproduced color images in real-time. Thus, output color spectra are matched between displays and prints, scans and prints, scans and displays, or copies and prints.

28 Claims, 4 Drawing Sheets

U.S. PATENT DOCUMENTS

| | | | |
|---|---|---|---|
| 5,950,040 A | 9/1999 | Mestha et al. | 399/46 |
| 5,967,033 A * | 10/1999 | Pfeiffer et al. | 101/211 |
| 6,005,970 A * | 12/1999 | Ohneda et al. | 382/162 |
| 6,046,820 A * | 4/2000 | Konishi | 358/1.9 |
| 6,052,195 A | 4/2000 | Mestha et al. | 356/425 |
| 6,081,353 A | 6/2000 | Tanaka et al. | 358/523 |
| 6,157,469 A | 12/2000 | Mestha | 358/504 |
| 6,172,681 B1 | 1/2001 | Ueda | 345/431 |
| 6,185,004 B1 * | 2/2001 | Lin et al. | 358/1.9 |
| 6,185,385 B1 | 2/2001 | Mestha et al. | 399/49 |
| 6,188,786 B1 | 2/2001 | Ueda et al. | 382/165 |
| 6,215,561 B1 | 4/2001 | Kakutani | 358/1.9 |
| 6,236,474 B1 | 5/2001 | Mestha et al. | 358/520 |
| 6,292,195 B1 | 9/2001 | Shimizu et al. | 345/431 |
| 6,320,668 B1 * | 11/2001 | Kim | 358/504 |
| 6,323,969 B1 | 11/2001 | Shimizu et al. | 358/523 |
| 6,344,902 B1 * | 2/2002 | Duke et al. | 359/1.9 |
| 6,384,895 B1 * | 5/2002 | Sawano | 358/501 |
| 6,594,388 B1 * | 7/2003 | Gindele et al. | 382/167 |
| 6,646,763 B1 * | 11/2003 | Estrada | 358/1.9 |
| 6,647,140 B1 * | 11/2003 | Wang et al. | 382/162 |
| 2003/0223098 A1 * | 12/2003 | Barasch et al. | 358/504 |

* cited by examiner

METHODS FOR PRODUCING DEVICE AND ILLUMINATION INDEPENDENT COLOR REPRODUCTION

BACKGROUND OF THE INVENTION

1. Field of Invention

This invention relates to device and illumination independent color reproduction.

2. Description of Related Art

Generally, colors are defined in two ways, in device dependent color spaces and in device independent color spaces. To illustrate, most color display monitors, such as, for example, color computer monitors, display colors in the red/green/blue (RGB) color space, i.e., with respect to the amount of red, green, and blue that a particular displayed color contains. Using this technique, the color yellow, for example, is displayed on a color display monitor by combining a red image value of 100 percent red with a green image value of 100 percent green and a blue image value of zero percent.

Furthermore, the red, green, and blue (RGB) color values associated with the particular colors for a color display monitor are device dependent. This means that the RGB values associated with a particular color, viewed on a specific color display monitor, are unique to that specific color display monitor or, at least, to that brand of color display monitor. Simply put, because RGB color values are device dependent, if identical RGB color values, such as, for example, a red image value of 100 percent red, a green image value of 100 percent green, and a blue image value of zero percent, are input and displayed on two different color display monitors, the resulting yellow color displayed on the two color display monitors will probably not appear exactly alike.

Similarly, most color marking devices, such as, for example, color printers, print colors in device dependent terms. However, unlike most color display monitors, most color marking devices use a cyan, magenta, yellow, and black (CMYK) color space, i.e., a combination of cyan (C), magenta (M), yellow (Y) and black (K) (CMYK) to arrive at the color marking device's printed colors. Consequently, as with RGB color values, CMYK color values are device dependent. Thus, as described above with respect to colors being displayed on color display monitors, if identical CMYK colors are printed by two different color marking devices; the printed colors will probably not appear exactly alike.

The other way of describing color is in device independent color spaces. By describing color in a device independent color space, consistent colors can be reproduced regardless of the type of device that is used to display or print the color. Therefore, color reproduction is generally done by defining colors in a device independent parameter space, such as, for example, L* a* b*, X Y Z, or L h v.

However, using device independent parameters for color reproduction does not eliminate the color matching problem. Device independent parameters remain illumination dependent and observer dependent. To illustrate, different illuminants, or lighting conditions, such as, for example, florescent lights, incandescent lights, or ordinary daylight, have their own spectral characteristics. Therefore, when a color document is viewed under different lighting conditions, the colors of that particular color document can show variations in color tone, saturation, and hue. The level of variation can be slight and barely noticeable, or the level of variation can be extreme and very noticeable. This is because a color's appearance is affected by the spectral characteristic of the particular light source that is illuminating the color.

Therefore, precisely reproducing a color using a device independent trichometric space parameter, such as, for example, L* a* b*, X Y Z, or L h v requires specification of both an illuminant, such as, for example, fluorescent light, and an observer, such as, for example, the user. Unfortunately, this technique only achieves a colorimetric match for the specified observer with the specified illuminant.

Thus, colorimetrically matched prints, such as, for example, prints matched to a device independent L* a* b* space from two different color printers exhibit varying amounts of similarity to each other under different lighting conditions. To illustrate, if a test image is printed using two similar printers that are calorimetrically matched using known device independent color control techniques, when the printed test images are compared to each other, side by side, under various lighting conditions, the color of the test image from the first printer will appear different from the color of the test image from the second printer. The colors will appear different unless the prints are calorimetrically matched, provided the observer and illumination spectra are matched between the colorimetric quantities of the two printers. The amount of noticeable difference between the two test prints varies, in part, depending on the colors that the test prints contain. These variations are especially noticeable when the test image contains an abundance of the color red. In color science, this phenomenon is well known and is called metamerism.

To add to the complexity of color matching between color marking devices, different color marking devices can use different types of toners, dyes, pigments, or inks to produce the outputted color images. Likewise, the color images can be produced on a wide range of copy media. Images can be produced, for example, on copy media ranging from paper to plastic or from fabric to metal. In each case, each combination of colorant and media produces a different optical appearance.

Moreover, different color devices have different color capabilities. Every color device, whether it is a color scanner, a color marking device, or a color display monitor, has a color gamut, i.e., a range of colors that it can capture, produce, or display. To illustrate the problems encountered when color matching is attempted between two different devices having two different color gamuts, consider color display monitors and color marking devices. Most color display monitors can display hundreds of thousands of colors. Conversely, color marking devices usually have a significantly smaller number of producible colors. Therefore, the gamut of a color display monitor usually exceeds the gamut of a color marking device. Thus, some of the colors that can be displayed on a color display monitor cannot be printed by a color marking device.

In an attempt to solve the problem of color matching, various color matching techniques have been developed that use models to translate colors from one color space to another color space. These models usually manifest themselves in the form of predetermined multi-dimensional look-up tables. These predetermined multi-dimensional look-up tables translate colors from one color space to another color space while attempting to maintain the translated color's perceived appearance. For example, if a user creates an image on a color display monitor and subsequently prints the created image without any color matching, the colors observed on the printed image may differ significantly from the colors originally observed on the color display monitor. However, if some type of color matching model is used, the discrepancies between the colors originally observed on the color display monitor and the colors observed on the printed image can be reduced.

One method of creating and updating a multi-dimensional look-up table is described in U.S. Pat. No. 6,157,469, incorporated herein by reference in its entirety. The incorporated 469 patent discloses a method of reducing and controlling color drift between a desired image, and an output image printed by a marking device that is intended to match the desired image, by detecting a current output color in the output image with a color sensing device. A difference between the current output color in the output image and a corresponding color in the desired image is then determined. A next output color in the output image is then automatically set equal to a corrected color that minimizes the difference between the next output color and the corresponding color in the image. This is preferably done on a real-time basis.

Additionally, in U.S. Pat. No. 6,236,474, incorporated herein by reference in its entirety, the error in an output color of a colored output image in a marking device intended to match a desired image is reduced. The method includes detecting a current output color in the output image with a color sensing device. A difference between the current output color and a corresponding target color under standard conditions is then determined. A marking device input-output relationship for a next output color is then automatically set based on the difference between the current output color and the corresponding target color under standard conditions to minimize the difference between the next output color and the corresponding target color.

Furthermore, in U.S. Pat. No. 6,052,195, incorporated herein by reference in its entirety, colorants are mixed to achieve a target color by combining individual colorants, detecting an output color of the combined colorants with a color sensing device and automatically adjusting the output color based on comparison between the detected output color and the target color.

SUMMARY OF THE INVENTION

However, known methods of creating and updating multi-dimensional look-up tables can only produce calorimetrically matched prints. Thus, since a color's appearance is greatly affected by the spectral characteristics of illuminants, calorimetrically matched reproduction will produce color prints that are likely to appear different when the color prints are viewed under changed lighting conditions.

Producing the same spectral power distributions in a reproduced image as in an original image is the only way to avoid image color variations caused by changes in illuminants and observers. In some applications, such as, for example, mail-order catalogues, it is desirable to have illuminant and observer independent color reproduction so that the color of an item displayed in the mail-order catalogue appears the same in every catalogue regardless of the lighting conditions under which the catalogue is viewed.

In the example given above, the color of the test image from the first printer appears different from the color of the test image from the second printer because color reproduction in the two printing devices was done using known illumination and observer dependent trichometric parameters.

This invention provides systems and methods that produce spectrally matched color outputs.

This invention separately provides systems and methods that use real-time sensing and feedback to improve spectral color matching.

This invention separately provides systems and methods that produce device and illumination independent color reproduction over a network.

This invention separately provides systems and methods that match an output spectra of selected colors with an output spectra of a target spectra stored in a computer memory.

This invention separately provides systems and methods that use low dimensional parametric control to produce a spectrally matched color transformation look-up table.

This invention separately provides systems and methods that use a spectrophotometer to aid in the construction of a look-up table.

This invention separately provides systems and methods that produce improved accuracy in the absence of an unmodelled system model.

This invention separately provides systems and methods that improved accuracy in the presence of drift or other unknown system disturbances that occur while generating printed images.

This invention separately provides systems and methods that map uncontrolled colors to a finite number of controlled colors inside a three-dimensional color space gamut.

This invention separately provides systems and methods that allow all the reproducible colors of a marking device to be matched spectrally.

This invention separately provides systems and methods that match colors between displayed images and printed images, scanned images and printed images, scanned images and displayed images, or copied images and printed images.

This invention separately provides systems and methods that generate spectrally matched color outputs, so that, a test image from a first printer will be spectrally color matched to the same test image produced by a second printer, provided colors are chosen within common intersections of the printers' gamuts.

This invention separately provides systems and methods that allow for self-correction of marking devices equipped with a sensor in the output paper path or on the output tray.

This invention separately provides systems and methods that match an output spectra of selected colors with an output spectra of a target spectra stored in a computer memory.

This invention separately provides systems and methods that match color spectra between displayed images and printed images, scanned images and printed images, scanned images and displayed images, or copied images and printed images.

In various exemplary embodiments of this invention, the systems and methods of this invention build a mapping table in real-time that is spectrally matched with a real-time sensor. The systems and methods of this invention can control, for example, printers that tend to drift over time. Additionally, the systems and methods of this invention ensure that the colors remain matched even if changes are made in the colorant, toner, pigment, ink, or copy media used in the marking device.

The output spectra matching is accomplished by producing color images with different color marking devices. Low dimensional parametric control systems and methods then produce a spectrally matched color transformation look-up-table. The look-up table is generated using data from a sensor, such as, for example, a spectrophotometer on the output trays of the marking devices to determine the output spectra of the produced images.

When the systems and methods of this invention are used to spectrally match colors to a color display, a spectrophotometer is used on the color display unit.

Various exemplary embodiments of the device and illumination independent color reproduction systems and methods according to this invention include a marking device with a real-time sensing capabilities usable to extract the reflection spectra of the marking device colors of an image formed on an image recording medium. The input to the color marking device is assumed as the device dependent colors CMY. The input to the color marking device is the output of a color controller. In various exemplary embodiments, the color controller receives two inputs. The first input includes the parameters of a desired color represented by a parameter vector, $\beta_T$, to be spectrally matched by the marking device. The second input includes the parameters of a measured color represented by a parameter vector, $\beta_M$. In various exemplary embodiments, the parameter vectors, $\beta_T$ and $\beta_M$ are parameters obtained by processing a reference spectra and a measured spectra, respectively.

In various exemplary embodiments of the device and illumination independent color reproduction systems and methods according to this invention, every possible output color for every pixel is measured so that every pixel can be spectrally matched with respect to a reference color.

These and other features and advantages of this invention are described in or are apparent from the following detailed description of the apparatus/systems and methods according to this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

For simplicity and clarification, the operating principles, design factors, and layout of the device and illumination independent color reproduction systems and methods according to this invention are explained with reference to various exemplary embodiments of the device and illumination independent color reproduction systems and methods according to this invention. The basic explanation of the operation of the device and illumination independent color reproduction systems and methods is applicable for the understanding and design of the constituent components employed in the device and illumination independent color reproduction systems and methods of this invention.

The systems of this invention include a marking device with a color sensor having real-time sensing capabilities. The color sensor measures the reflectance spectra on a printed color image. This measured reflectance spectra is then compared to a reference spectra and used to compensate subsequent color prints from the color marking device. In various exemplary embodiments described below, the input to the color marking device is in the device dependent color spaces, cyan, magenta and yellow (CMY) or cyan, magenta, yellow and black (CMYK).

Figure 1:
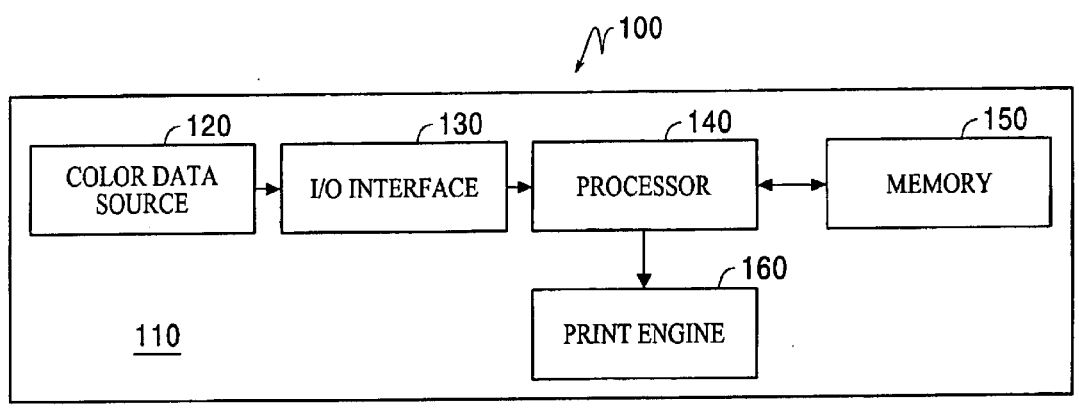
FIG. 1 is a functional block diagram outlining a first exemplary embodiment of a device and illumination independent color reproduction system according to this invention.

FIG. 1 is a functional block diagram outlining a first exemplary embodiment of a device and illumination independent color reproduction system 100, according to this invention. As shown in FIG. 1, the device and illumination independent color reproduction system 100 includes a color image data source 101, which is connected by a link 105 to a processing circuit 110, a color controller 120, a color marking device 130, and a processing circuit 140.

The color image data source 101 can be a locally or remotely located desk top or laptop computer, a personal digital assistant (PDA), a scanner, a facsimile machine, a digital camera, or a device suitable for storing and/or transmitting electronic color image data, such as a client or server of a network, or the Internet, and especially the World Wide Web, or any other known or later developed device that is capable of supplying color image data to the device and illumination independent color reproduction system 100.

The link 105 can be any known or later developed device or system for connecting the device and illumination independent color reproduction system 100 to the color image data source 101, including a direct wired connection, a connection of an intranet, an extranet, the Internet, a local area network, a wide area network, or any other presently known or later developed distributed network, a connection over the public switched telephone network, a connection over a coaxial cable (i.e., CATV) system, a connection over a cellular telephone network, a satellite connection or the like. In general, the link 105 can be any known or later developed connection system or structure usable to connect the device and illumination independent color reproduction system 1100 to the color image data source 101, including both wired and wireless connections.

The color controller 120 includes a controller 129 and a memory 125. The memory 125 includes a feed-forward mapping look-up table that contains at least an image parameter mapping look-up table. The controller 129 constructs and dynamically changes the mapping look-up table contained in the memory 125.

The memory 125 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The color marking device 130 includes a color marking device 133, such as, for example, a color printer, and a color sensor 135, such as, for example, a spectrophotometer. In various exemplary embodiments, the color sensor 135 is embedded in the output paper path of the color marking device 130. In various other exemplary embodiments, the color sensor 135 is positioned within the output tray of the color marking device 130.

During operation of the first exemplary embodiment of the device and illumination independent color reproduction system 100, the processing circuit 110 receives an input reference spectra $R_T(\lambda)$ from the color image data source 101 via the link 105. Once the processing circuit 110 has received the reference spectra $R_T(\lambda)$ the processing circuit 110 transforms the reference spectra $R_T(\lambda)$ into a reference color described in parameter vectors, such as, for example, L* a* b*, X Y Z, or L h v. The reference parameter vectors are represented by a reference parameter vector $\beta_T$. Thus, the reference parameter vector $\beta_T$ represents the desired reference color to be spectrally matched by the color marking device 130.

In various exemplary embodiments, reference colors are used to obtain the reference spectra $R_T(\lambda)$. Because it can be difficult to obtain a reference color for each pixel within the color marking device gamut, in various exemplary embodiments, only certain critical pixels are measured. For example, the reference spectra for selected critical colors is measured using a Pantone® custom color set. The reflectance spectra is then stored, for example, in a memory contained in the color data image source 101 or in a memory in the processing circuit 110. This stored reflection spectra is used to convert the reference spectra $R_T(\lambda)$ into a parameter vector.

In various other exemplary embodiments, the reference spectra $R_T(\lambda)$ is converted into the reference parameter vector $\beta_T$ through a linear transformation. One method of linear transformation is disclosed in the incorporated 114 patent application. This approach produces five to seven parameters in the parameter vector per spectra and uses the concept of basis vectors obtained from extensive experimentation on the color marking device. In various exemplary embodiments, a memory inside the processing circuit contains the parameter vector corresponding to the reflectance spectra $R_T(\lambda)$.

Alternatively, the reference spectra $R_T(\lambda)$ is converted into the reference parameter vector $\beta_T$ as outlined below. This approach uses only three parameters in the parameter vector per spectra from the standard CIE, XYZ or L* a* b* formulas. In various other exemplary embodiments, more than three parameters are used in the parameter vector per spectra.

First, the standard X, Y, Z, tristimulus values are determined using observer functions $\bar{x}(\lambda)$, $\bar{y}(\lambda)$, and $\bar{z}(\lambda)$, an illuminant spectra, $S(\lambda)$, and the reference reflectance spectra $R_T(\lambda)$, for $R(\lambda)$. The equations for tristimulus values are shown below.

$$X = \frac{100 \cdot \sum \{S(\lambda) \cdot R(\lambda) \cdot \bar{x}(\lambda)\}}{\sum \{S(\lambda) \cdot \bar{y}(\lambda)\}},$$

$$Y = \frac{100 \cdot \sum \{S(\lambda) \cdot R(\lambda) \cdot \bar{y}(\lambda)\}}{\sum \{S(\lambda) \cdot \bar{y}(\lambda)\}}, \text{ and}$$

$$Z = \frac{100 \cdot \sum \{S(\lambda) \cdot R(\lambda) \cdot \bar{z}(\lambda)\}}{\sum \{S(\lambda) \cdot \bar{y}(\lambda)\}}.$$

where X, Y, and Z are tristimulus values for the light source used.

Next, the L* a* b* color values are determined using an XYZ to CIELAB color space transformation. The equations for the L* a* b* color values are shown below.

$L^* = 116 \cdot [f(Y/Y_n) - 16/116]$, $a^* = 500 \cdot [f(X/X_n) - f(Y/Y_n)]$, and $b^* = 200 \cdot [f(Y/Y_n) - f(Z/Z_n)]$;

where:

$f(w) = w^{1/3}$, for $w \geq 0.008856$; and $f(w) = 7.787 \, w + \frac{16}{116}$, for $w < 0.008856$;

where w is the ratio of two variables, such as, for example, $Y/Y_n$ from the equation for L*.

In various exemplary embodiments, the illuminant spectra $S(\lambda)$ matches the illuminant spectra used in the processing circuit 110.

Once the reference spectra $R_T(\lambda)$ has been converted into the reference parameter vector $\beta_T$ the reference parameter vector $\beta_T$ is sent to the color controller 120. Then, using the feed-forward mapping look-up table in the memory 125, the color controller 120 converts the reference parameter vector $\beta_T$ into the desired reference color to be spectrally matched by the color marking device 130 in the device dependent color space. The desired reference color is then sent to the color marking device 130 to be printed.

As the color marking device 130 prints the desired reference color, the color sensor 135 measures the reflectance spectra of the printed desired reference color. Once the reflectance spectra of the printed desired reference color is measured, a measured reflectance spectra $R_M(\lambda)$ is sent to the second processing circuit 140.

When the measured reflectance spectra $R_M(\lambda)$ is received by the second processing circuit 140, the second processing circuit 140 converts the measured reflectance spectra $R_M(\lambda)$ into a parameter vector, as described above with reference to the first processing circuit 110. However, the measured reflectance spectra $R_M(\lambda)$ is used in place of the reference reflectance spectra $R_T(\lambda)$ for $R(\lambda)$.

The output of the second processing circuit 140 is converted to a parameter vector that is represented by a measured parameter vector $\beta_M$. Thus, the measured parameter vector $\beta_M$ represents the measured spectra of the desired reference color, printed by the color marking device 130, that is to be spectrally matched by the color marking device 130.

It should be understood that the conversion techniques used in the first processing circuit 110 and the second processing circuit 140 use the same tristimulus values and the same illumination spectra. In various exemplary embodiments, the illumination spectra does not correspond to the light source spectra that is normally used inside the spectrophotometer sensor.

Next, the measured parameter vector $\beta_M$ and the reference parameter vector $\beta_T$ are sent to the color controller 120. The reference and measured parameter vectors $\beta_T$ and $\beta_M$ are parameters obtained by processing the reference spectra and measured spectra in the processing circuit 110 and the processing circuit 140, respectively, as described above.

After the measured parameter vector $\beta_M$ and the reference parameter vector $\beta_T$ are received by the color controller 120, the controller 129 compares the measured parameter vector $\beta_M$ with the reference parameter vector $\beta_T$ and obtains an error vector E. The error vector E represents the difference between the measured parameter vector $\beta_M$ and the reference parameter vector $\beta_T$.

The error vector E is then used by the controller 129, as described in the incorporated 469, 474 or 195 patents, to automatically set a next output color, preferably on a real-time basis, in the output image equal to an updated color value that minimizes the difference between the next output color and the previously measured output color of the output image.

For the device and illumination independent color reproduction system 100 to produce an output spectra that closely matches the input spectra, the error vector E must be equal to zero. Unfortunately, due to various system limitations, including measurement errors, the input spectra and the output spectra will not match exactly. However, according to the systems and methods described above, matching between the input spectra and the output spectra should be sufficiently close so that the difference between the input color and the output color ($\Delta E$) will not be within perceivable limits.

Figure 2:
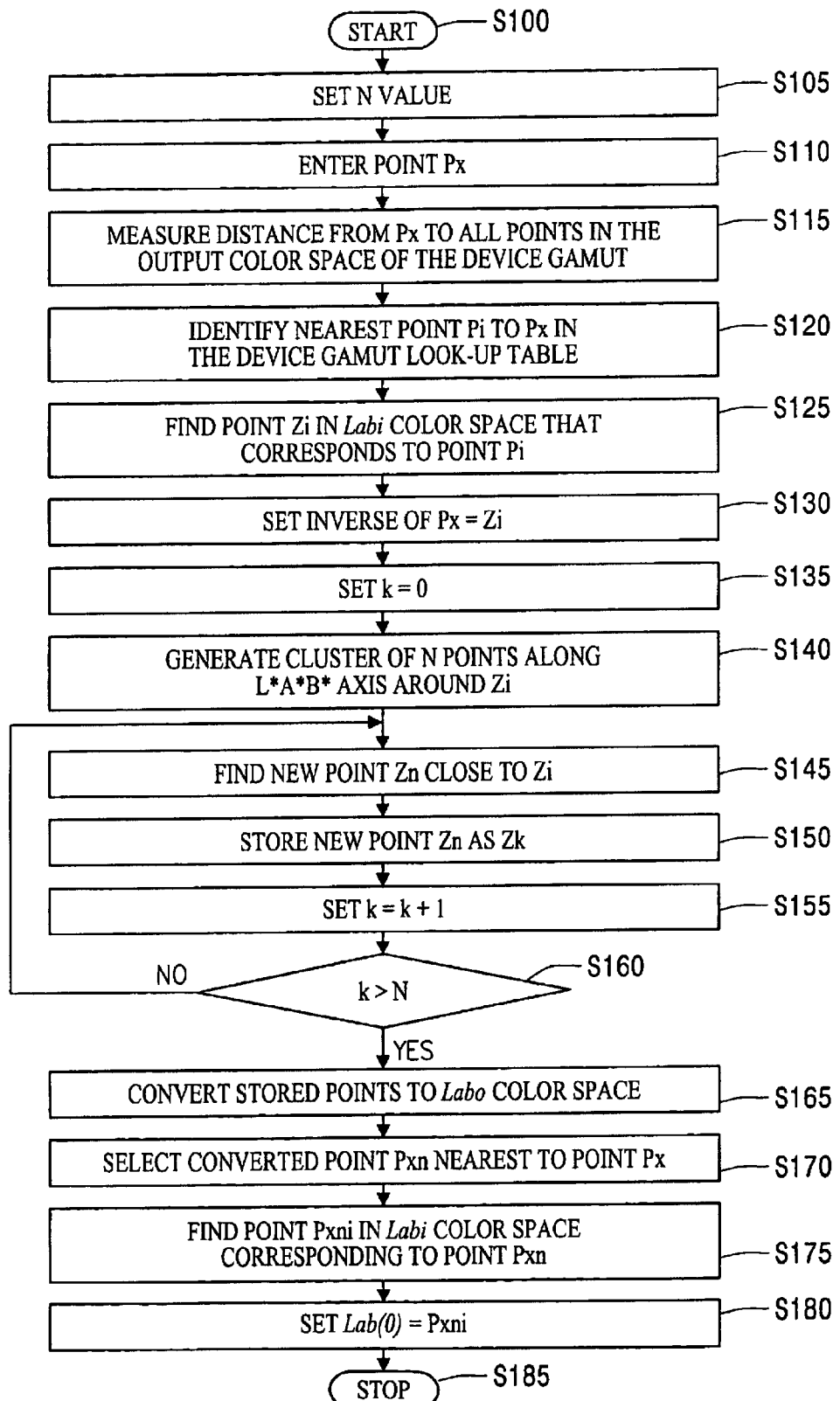
FIG. 2 is a functional block diagram outlining a second exemplary embodiment of a device and illumination independent color reproduction system according to this invention.

FIG. 2 is a functional block diagram outlining a second exemplary embodiment of a device and illumination independent color reproduction system 200 according to this invention. As shown in FIG. 2, the device and illumination independent color reproduction system 200 includes a color image data source 201 connected by a link 205 to a processing circuit 210, a color controller 220, a color marking device 230, a processing circuit 240, a controller 229, a memory 225, a color marking device 233 and a color sensor 235.

The color image data source 201, the link 205, the processing circuit 210, the color controller 220, the color marking device 230, the processing circuit 240, the controller 229, the memory 225, the color marking device 233 and the color sensor 235 correspond to and operate similarly to the same elements discussed above with respect to FIG. 1.

The device and illumination independent color reproduction system 200 shown in FIG. 2 operates as described above with respect to the device and illumination independent color reproduction system 100 shown in FIG. 1.

However, the device and illumination independent color reproduction system 200 shown in FIG. 2 also includes a second memory 250. The second memory 250 includes a feed-forward mapping look-up table that contains at least an image parameter mapping look-up table. The second memory 250 stores image parameters $P_1$, which are output from the color image data source 201, the reference parameter vector $\beta_T$ which is output from the first processing circuit 210, and the device dependent colors, CMY, which are output from the color controller 220.

The second memory 250 can be distinct from the memory 225. Alternatively, the memories 225 and 250 can be distinct portions of the same physical device or devices. When implemented as a separate device, the second memory 250 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

As shown in FIG. 2, the link 205 also connects the color image data source 201 to the second memory 250 to allow image parameters $P_1$ to be input to the memory 250.

In the image parameter mapping look-up table stored in the second memory 250, the critical colors, as discussed above with reference to the first exemplary embodiment, become target colors for the device and illumination independent color reproduction system 200. In various exemplary embodiments, the target colors are chosen based on a sequential linear interpolation (SLI) method. The SLI method requires extensive color marking device input-output experimentation. The sequential linear interpolation (SLI) method attempts to minimize the mean square error between the original nonlinear function and its approximation by generating optimal nodes and/or grid points, with more grid points in regions of the gamut where the function to be interpolated is less linear. These grid points then become the critical color coordinates for the parameter vectors selected as described above.

Additionally, the device and illumination independent color reproduction system 200 shown in FIG. 2 also includes a switch 260 connected between the color controller 220 and the color marking device 230. When the switch 260 is closed, the image parameter mapping look-up table stored in the second memory 250 is created or updated. When the image parameter mapping look-up table stored in the second memory 250 has been created or updated, the switch 260 is opened.

The structure of the controller 229 is similar to that described in the incorporated 469 patent. Once the output of the color marking device 230 is controlled to match the target color spectra, the mapping required in the second memory 250 for other colors inside the gamut of the color marking device 230 is obtained using various other interpolation schemes depending on how the target, or critical, colors are selected. For example, if the sequential linear interpolation (SLI) based method of sequential linear interpolation is used, the mapping requires the use of SLI methods because the critical colors, as selected by the SLI method actually fall on a sequential plane and are non-uniformly spaced. However, when the critical colors are uniformly spaced, other exemplary embodiments use a tetrahedral or trilinear interpolation method elect the critical colors.

When image colors are mapped with the new image parameter look-up table as described above, other colors that are inside the gamut of the color marking device 230 that were not previously spectrally matched are now spectrally matched.

In various exemplary embodiments, when the switch 260 is closed the image parameter mapping look-up-table is constructed using multidimensional interpolation functions. The multidimensional interpolation functions use a target parameter vector and an output vector $\beta_o$ of the color controller 220. The image parameter mapping look-up table contains the spectrally matched transformation table to convert all the input image parameters $P_1$ to the device dependent trichometric space parameter X Y Z, L* a* b* or CMY.

If the output of the image parameter look-up table is defined in a CMY color space parameter, conversion from the CMY color space parameter to a CMYK color space parameter is performed using well known gray component replacement or under-color removal techniques. Alternatively, if the output of the image parameter look-up table is defined in a X Y Z or L* a* b* color space parameter, conversion from the X Y Z or L* a* b* color space parameter to the CMYK color space parameter is performed inside the color marking device 233. However, in situations where device dependent colors, or device primaries, other than CMYK are used, such as, for example, $C_1, C_2, C_3, \ldots C_N$, where N is the number of primaries, as in hi-fi printing, image processing circuits 210 and 240 perform the transformations. In various exemplary embodiments, the transformations are performed using the techniques outlined in the incorporated 114 patent application. Once the image parameter mapping look-up-table is constructed the switch 260 is opened.

When the image parameter mapping look-up-table is constructed and the switch 260 is opened, all color prints subsequently submitted by the color image data source 201 to the color marking device 230 are converted using the image parameter mapping look-up-table stored in the second memory 250.

Figure 3:
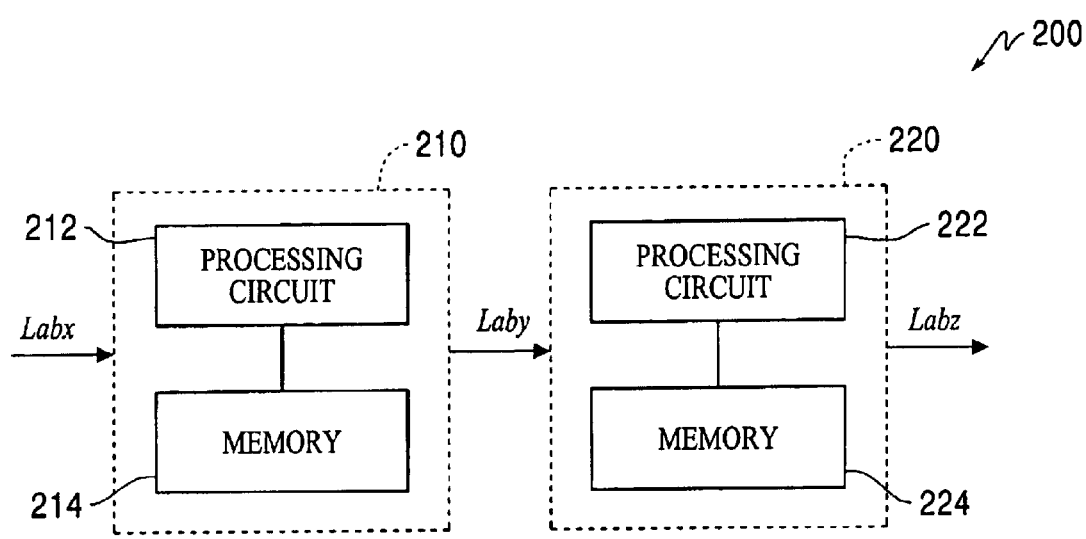
FIG. 3 is a flowchart outlining one embodiment of a control routine using the device and illumination independent color reproduction system of this invention.

FIG. 3 is a flowchart outlining one embodiment of a control routine using the device and illumination independent color reproduction system of this invention. In FIG. 3, the method can begin as part of a color warrantee method or, alternatively, by the user initiating the device independent color control methods of this invention.

As shown in FIG. 3, beginning in step S100, control continues to step S105, where a reference reflectance spectra is generated as described above.

Then, in step S110, the reference reflectance spectra generated in step S105 is converted to a converted reference parameter vector $\beta_T$. In various exemplary embodiments, the reference reflectance spectra generated in step S105 is converted to a reference parameter vector $\beta_T$ using the method outlined above. In various other exemplary embodiments, the method described in the 114 patent is used to generate the converted reference parameter vector $\beta_T$. Next, in step S115, a color image is generated using the converted reference parameter vector $\beta_T$. Control then advances to step S120.

In step S120, the generated color image is illuminated. Next, in step S125, while the generated color image is still illuminated, the reflectance spectra of the generated color image is measured. Then, in step S130, the measured reflectance spectra of the illuminated color image is converted to a converted measured parameter vector $\beta_M$, as described above. Control then advances to step S135.

In step S135, the converted measured parameter vector $\beta_M$ is compared to the converted reference parameter vector $\beta_T$ obtained in step S110. Then, in step S140, a determination is made whether the difference between the converted measured parameter vector $\beta_M$ and the converted reference parameter vector $\beta_T$ has reached a predetermined value. If, in step S140, the difference has not reached the predetermined value, control advances to step S145. Otherwise control jumps to step S160.

In step S145, a comparison table is generated to compensate for a difference between the converted measured parameter vector $\beta_M$ and the converted reference parameter vector $\beta_T$. Next, in step S150, a subsequent color image is compensated using the comparison table generated in step S145 and the parameter vectors $\beta_M$ and $\beta_T$. Then, in step S155, a color image is generated using the comparison table generated in step S145 and the parameter vectors $\beta_M$ and $\beta_T$. Control then returns to step S120.

In contrast, in step S160, an image parameter mapping look-up table is reconstructed using the processed parameter vectors.

Next, in step S165, all subsequent color images are printed using the reconstructed image parameter mapping look-up table generated in step S160. Then, in step S170, the method ends.

In various exemplary embodiments, the device and illumination independent color reproduction systems shown in FIGS. 1 and 2, according to this invention is implemented using a color controller. However, the device and illumination independent color reproduction systems shown in FIGS. 1 and 2 can also be implemented on a general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 3, can be used to implement the device and illumination independent color reproduction systems shown in FIGS. 1 and 2.

It should be appreciated that any other known or later developed image forming device that produces color output documents could be modified to incorporate the device and illumination independent color reproduction systems and methods described herein.

Moreover, the device and illumination independent color reproduction systems and methods described herein can be implemented as software executing on a programmed general purpose computer, a special purpose computer, a microprocessor or the like. In this case, the device and illumination independent color reproduction systems and methods described herein can be implemented as a routine embedded in a printer driver, as a resource residing on a server, or the like. The device and illumination independent color reproduction systems and methods described herein can also be implemented by physically incorporating them into a software and/or hardware system, such as the hardware and software systems of a printer or a digital photocopier.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

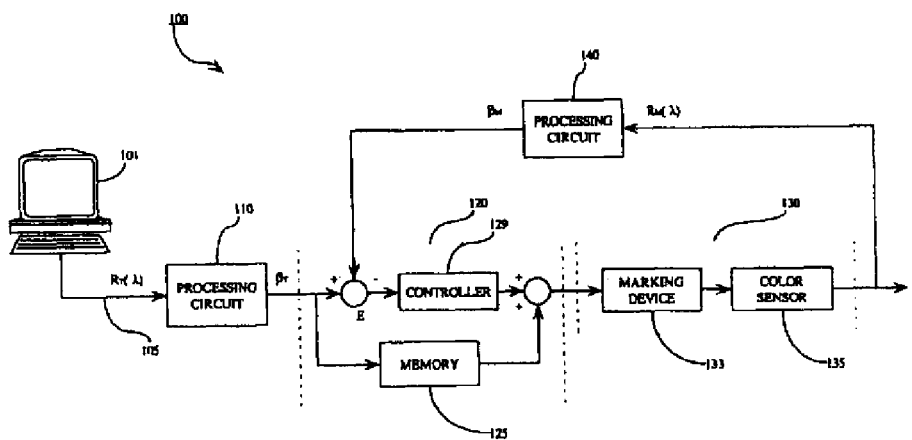

What is claimed is:

1. A device and illumination independent color reproduction system, comprising:
   a color marking device including a color sensor that measures a reflectance spectra;
   a color controller including a memory and a controller, the memory including an image parameter look-up table;
   a first processing circuit that converts a reference color spectra into a reference parameter vector; and
   a second processing circuit that converts the measured reflectance spectra into a measured parameter vector,
   wherein the controller updates the image parameter look-up table based on the measured reflectance spectra.

2. The device and illumination independent color reproduction system of claim 1, including an image parameter mapping look-up table that translates color image parameters to a device dependent color space.

3. The device and illumination independent color reproduction system of claim 1, including an image parameter mapping look-up table that translates the color image parameters to a device independent color space.

4. The device and illumination independent color reproduction system of claim 1, wherein the color sensor is mounted in an output paper path of the color marking device.

5. The device and illumination independent color reproduction system of claim 1, wherein the color sensor is mounted within an output tray of the color marking device.

6. The color reproduction system of claim 1, further comprising at least one color image data source connectable to the first processing circuit.

7. The color reproduction system of claim 6, wherein each at least one color image data source is one of a locally or remotely located computer, a personal digital assistant, a scanner, a digital camera, or a facsimile machine.

8. An apparatus for improving color reproduction, comprising:

a first processing circuit that converts a reference color spectra into a reference parameter vector;

a first controller that converts the reference parameter vector to a processed reference parameter vector based on stored image parameters;

a color marking device that prints an image based on the processed reference parameter vector;

a color sensor that measures reflectance spectra of the image printed based on the processed reference parameter vector;

a second processing circuit that converts the measured reflectance spectra into a measured parameter vector;

a second controller that compares the reference parameter vector with the measured parameter vector and, if the second controller determines that the reference parameter vector is not within an acceptable range of equivalents to the corresponding measured parameter vector, produces a compensated description of errors and the parameter vectors after processing the errors and the parameter vectors, wherein the measured reflectance spectra is used to update the stored image parameters.

9. A method for improving color reproduction, comprising:

receiving a reference reflectance spectra;

converting the reference reflectance spectra to a corresponding reference parameter vector using a stored image parameter;

printing an image based on the converted reference parameter vector;

measuring reflectance spectra of the image printed based on the converted reference parameter vector;

converting the measured reflectance spectra to a corresponding measured parameter vector;

comparing the reference parameter vector to the measured parameter vector to determine an error vector; and processing the error vector and the parameter vectors to produce spectrally matched color outputs, wherein the measured reflectance spectra is used to update the stored image parameter.

10. The method of claim 9, wherein converting the reference reflectance spectra includes storing the reference reflectance spectra in a look-up-table.

11. The method of claim 9, wherein converting the reference reflectance spectra includes measuring a reflectance spectra of predetermined pixels of the image.

12. The method of claim 9, wherein converting the reference reflectance spectra includes converting the reference reflectance spectra through a linear transformation.

13. The method of claim 9, wherein converting the reference reflectance spectra includes converting the reference reflectance spectra through a non-linear transformation.

14. The method of claim 9, wherein converting the reference reflectance spectra includes converting the reference reflectance spectra using predetermined algorithms.

15. The method of claim 14, wherein converting the reference reflectance spectra using predetermined algorithms includes using only three parameters in the parameter vector per spectra from one of the standard CIE, xyz or L* a* b* color spaces.

16. The method of claim 14, wherein converting the reference reflectance spectra using predetermined algorithms includes using more than three parameters in the parameter vector per spectra.

17. The method of claim 14, wherein converting the reference reflectance spectra using predetermined algorithms includes computing standard X, Y, Z, tristimulus values.

18. The method of claim 17, wherein converting the reference reflectance spectra using predetermined algorithms includes computing L* a* b* color values.

19. The method of claim 9, wherein converting the measured reflectance spectra includes storing the measured reflectance spectra in a look-up-table.

20. The method of claim 9, wherein converting the measured reflectance spectra includes measuring a reflectance spectra of predetermined pixels of the image.

21. The method of claim 9, wherein converting the measured reflectance spectra includes converting the measured reflectance spectra through a linear transformation.

22. The method of claim 9, wherein converting the measured reflectance spectra includes converting the measured reflectance spectra through a non-linear transformation.

23. The method of claim 9, wherein converting the measured reflectance spectra includes converting the measured reflectance spectra using predetermined algorithms.

24. The method of claim 23, wherein converting the measured reflectance spectra using predetermined algorithms includes using only three parameters in the parameter vector per spectra from one of the standard CIE, xyz or L* a* b* color spaces.

25. The method of claim 23, wherein converting the measured reflectance spectra using predetermined algorithms includes using more than three parameters in the parameter vector per spectra.

26. The method of claim 23, wherein converting the measured reflectance spectra using predetermined algorithms includes computing standard X, Y, Z, tristimulus values.

27. The method of claim 26, wherein converting the measured reflectance spectra includes computing L* a* b* color values.

28. The method of claim 9, wherein the received reference reflectance spectra is converted into the reference parameter vector using observer functions, an illuminant spectra, and a reference reflectance spectra.

* * * * *

UNITED STATES PATENT AND TRADEMARK OFFICE
CERTIFICATE OF CORRECTION

| | | |
|---|---|---|
| PATENT NO. | : 6,934,053 B1 | Page 1 of 5 |
| APPLICATION NO. | : 09/487586 | |
| DATED | : August 23, 2005 | |
| INVENTOR(S) | : Lingappa K. Mestha and S. Dianat | |

It is certified that error appears in the above-identified patent and that said Letters Patent is hereby corrected as shown below:

The Title Page, showing an illustrative figure, should be deleted and substitute therefor the attached title page.

Figure 4:
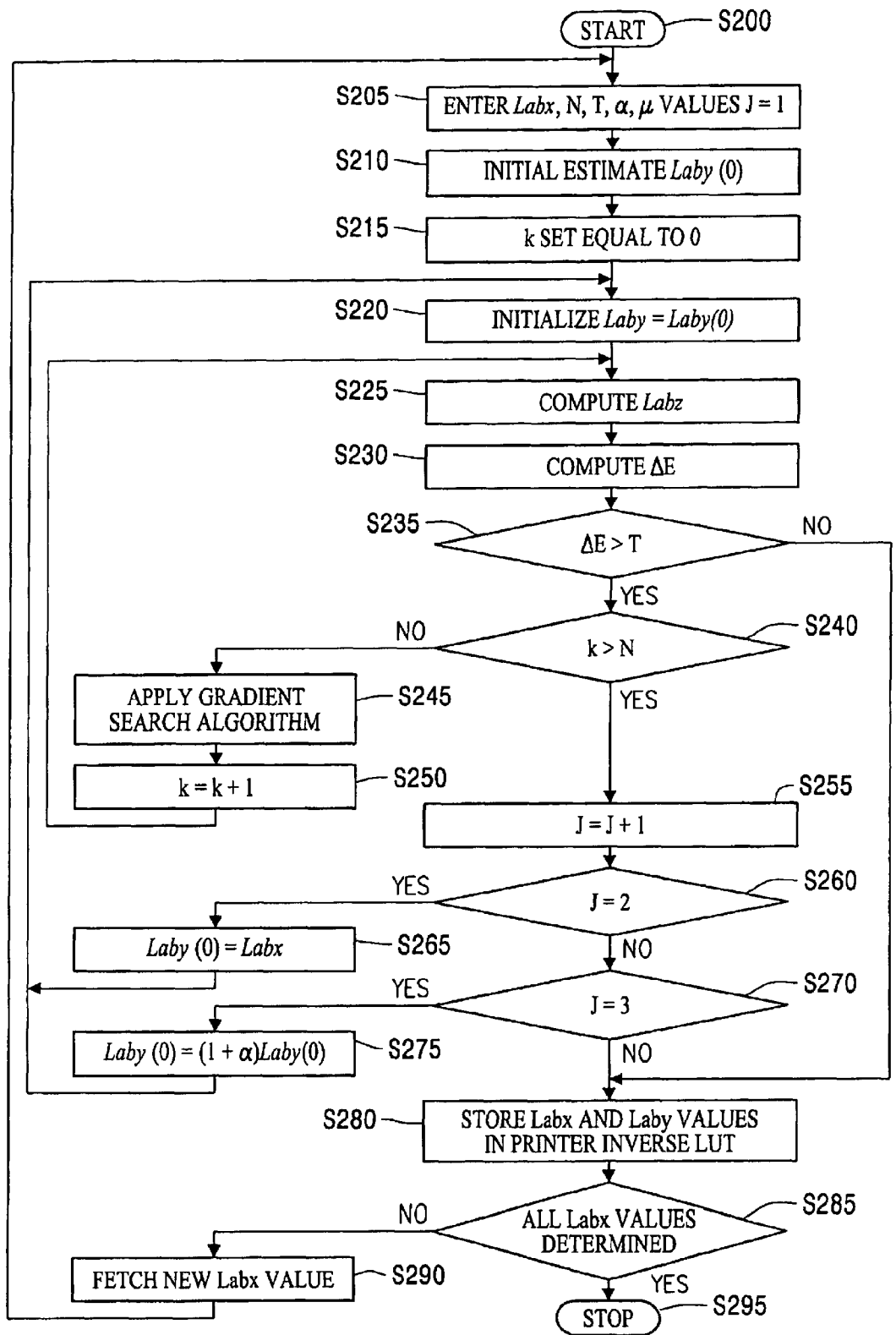
Figure 1:
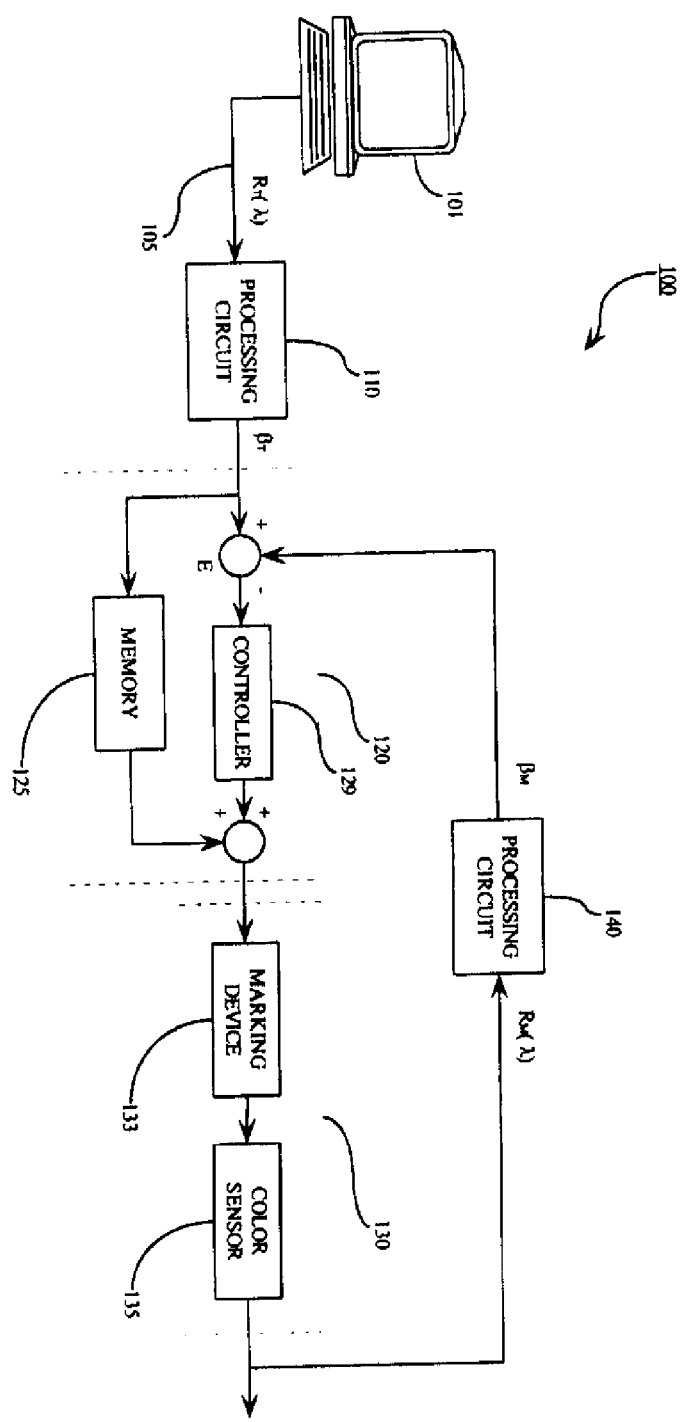
Figure 2:
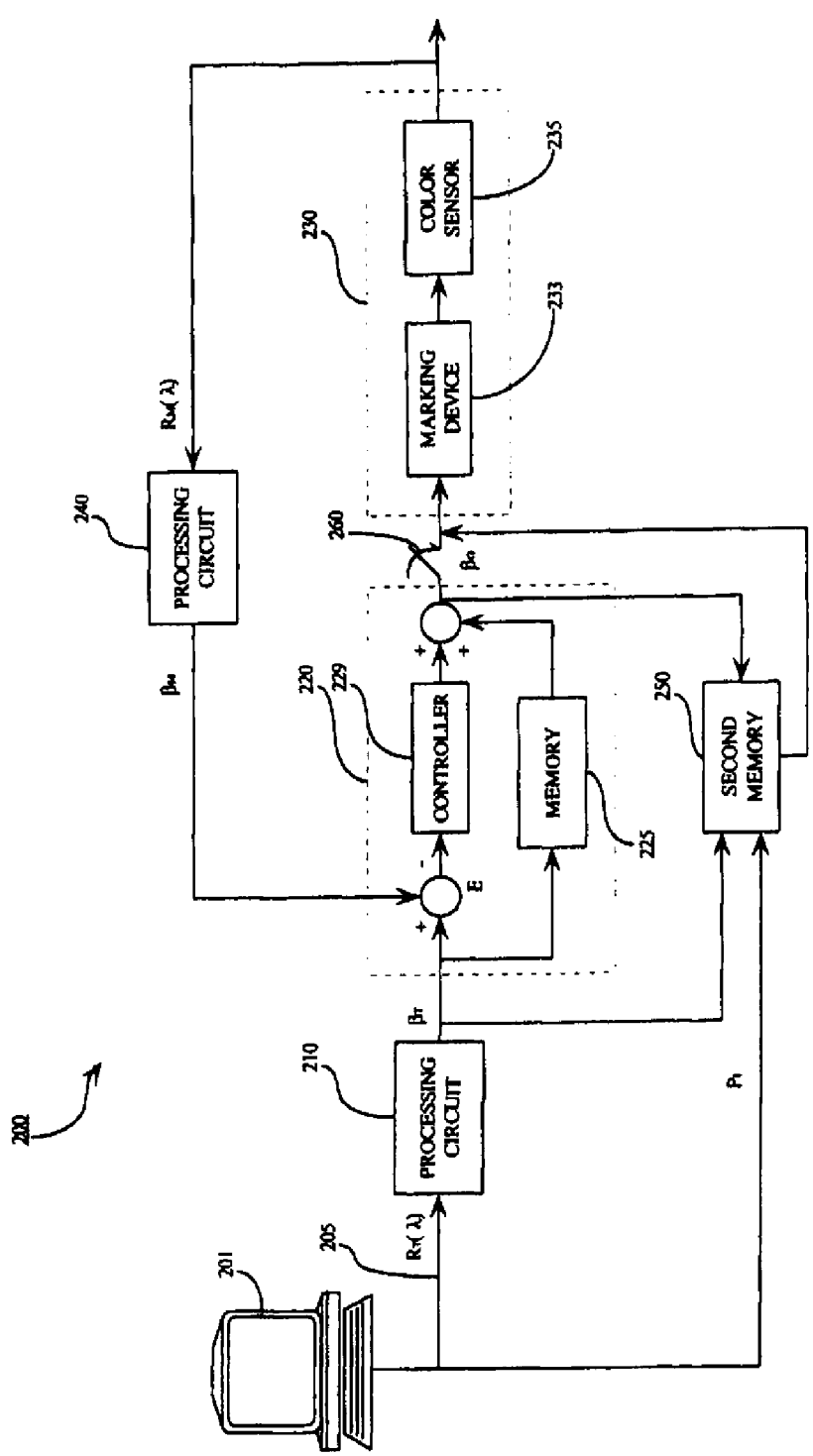
Figure 3:
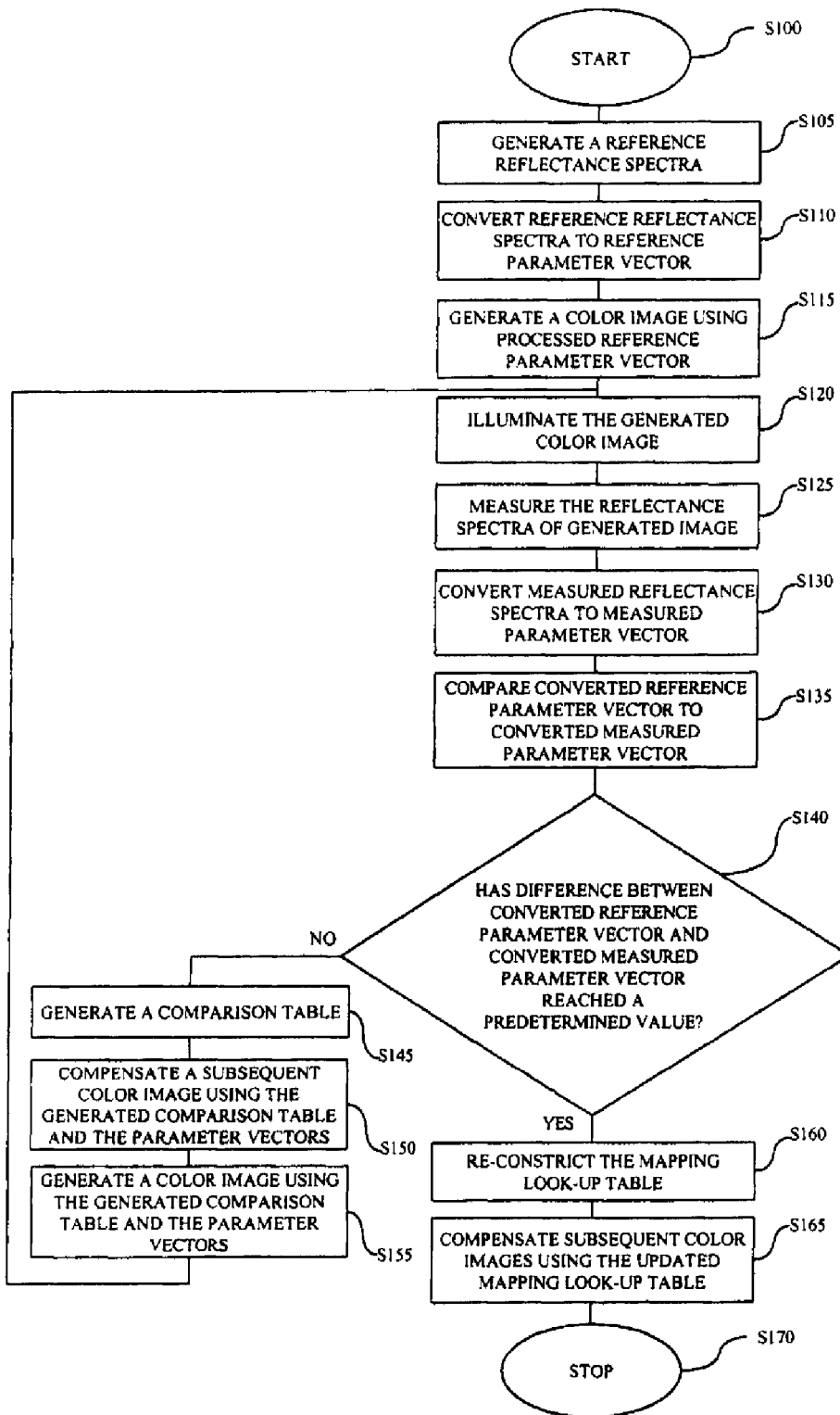
Figure 1:
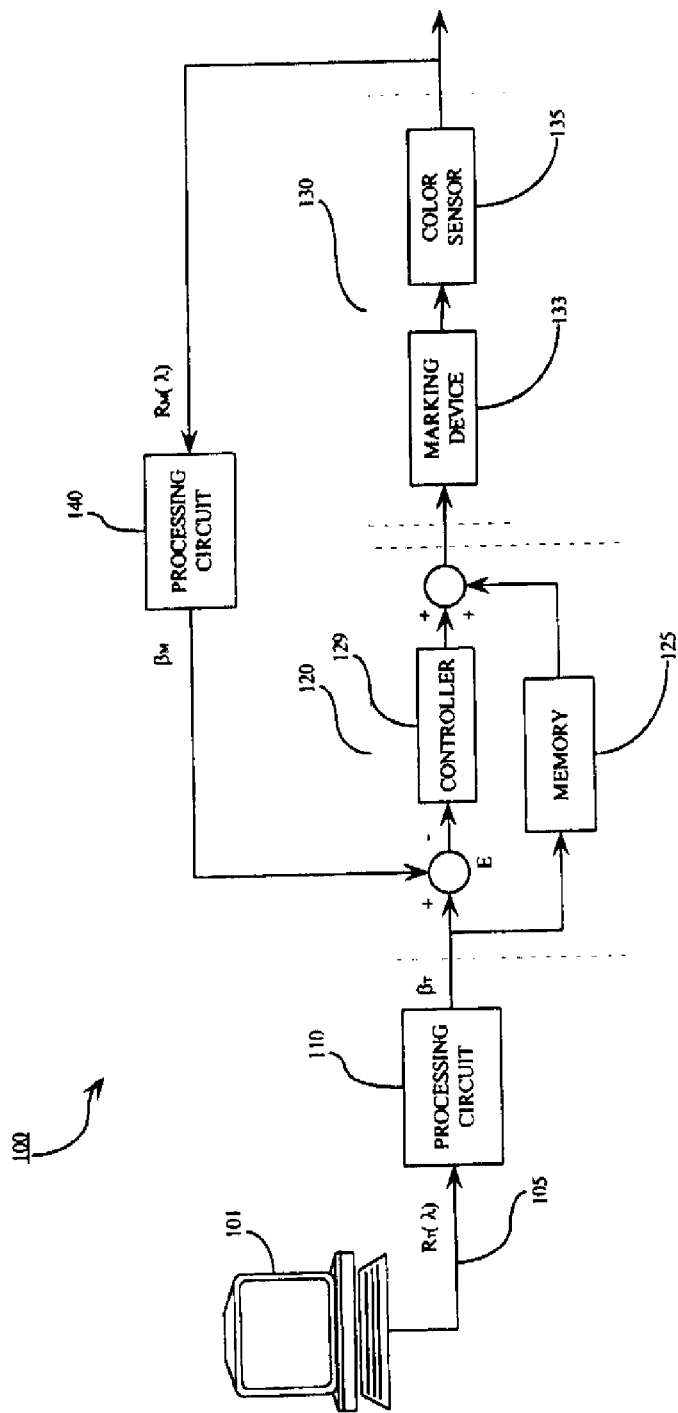
Figure 2:
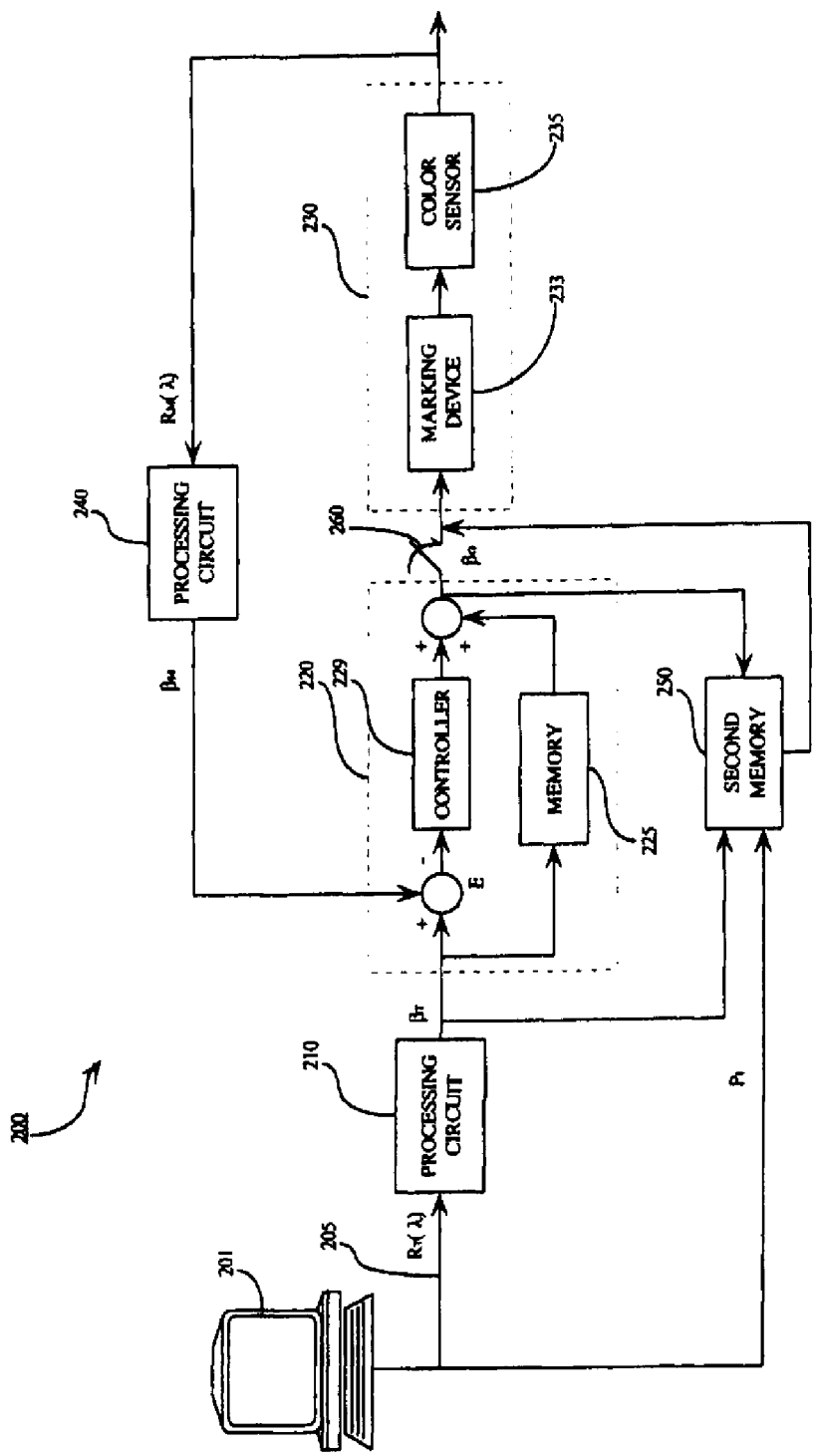
Figure 3:
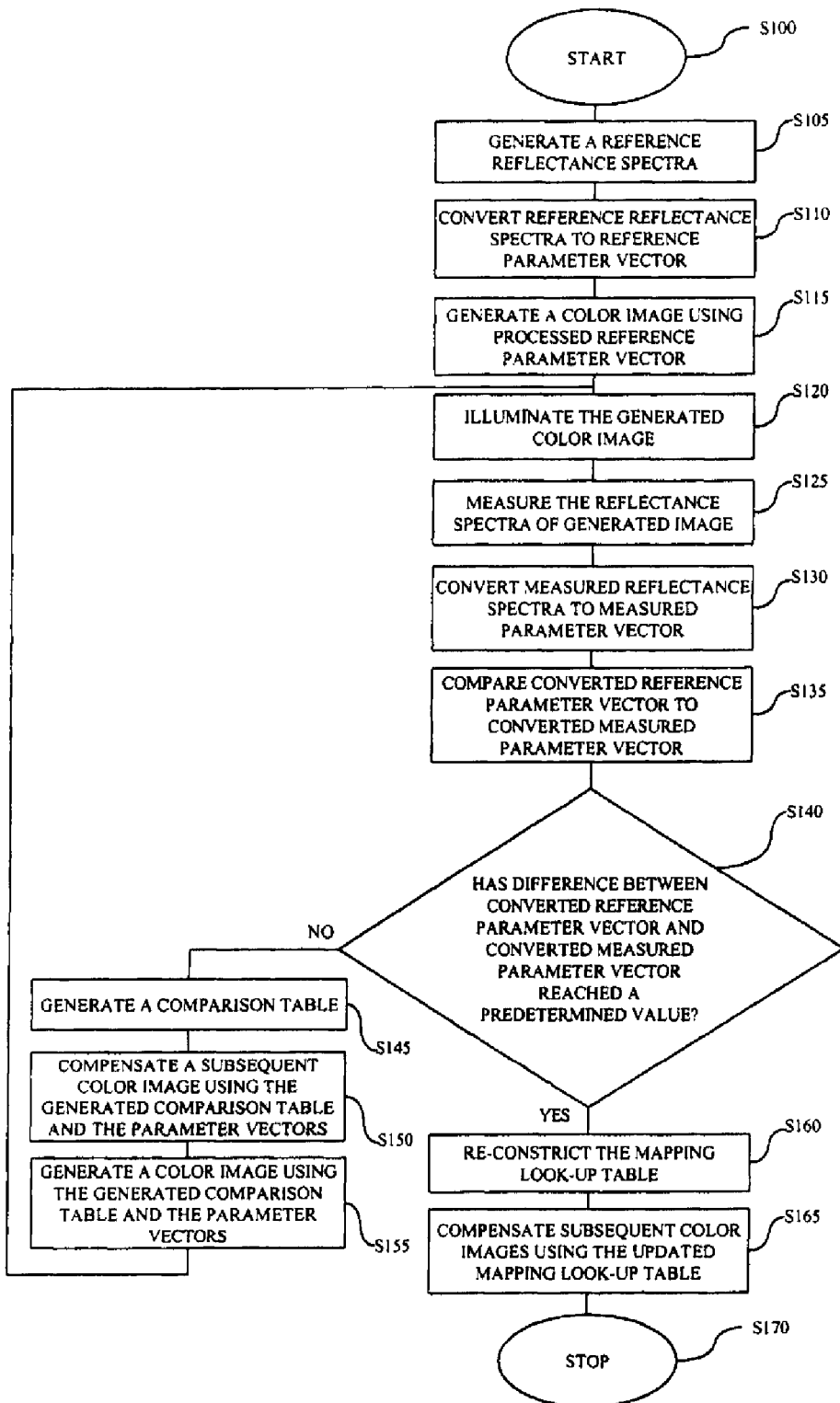

Figure 1, change to the attached Figure 1;

Page 4, Figure 2, change to the attached Figure 2;

Page 5, Figure 3, change to the attached Figure 3;

Page 6, Figure 4, please delete.

Signed and Sealed this

Eighth Day of September, 2009

David J. Kappos
*Director of the United States Patent and Trademark Office*

United States Patent
Mestha et al.

(10) Patent No.: US 6,934,053 B1
(45) Date of Patent: Aug. 23, 2005

(54) METHODS FOR PRODUCING DEVICE AND ILLUMINATION INDEPENDENT COLOR REPRODUCTION

(75) Inventors: Lingappa K. Mestha, Fairport, NY (US); Sohail A. Dianat, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,586

(22) Filed: Jan. 19, 2000

(51) Int. Cl.$^7$ .............. H04N 1/56; H04N 1/60

(52) U.S. Cl. .......... 358/1.9; 358/504; 358/523

(58) Field of Search .......... 358/1.9, 518, 504, 358/523, 501, 520, 521, 406, 530; 382/167, 312

(56) References Cited

U.S. PATENT DOCUMENTS

| | | | |
|---|---|---|---|
| 4,959,669 A | | 9/1990 | Haneda et al. .......... 346/157 |
| 5,200,816 A | | 4/1993 | Rose .......... 358/80 |
| 5,339,176 A | | 8/1994 | Smilansky et al. .......... 358/504 |
| 5,357,448 A | | 10/1994 | Stanford .......... 364/526 |
| 5,452,111 A | * | 9/1995 | Giorgianni et al. .......... 358/504 |
| 5,481,380 A | * | 1/1996 | Bestmann .......... 358/504 |
| 5,502,799 A | * | 3/1996 | Tsuji et al. .......... 345/600 |
| 5,612,902 A | * | 3/1997 | Stokes .......... 364/526 |
| 5,664,072 A | * | 9/1997 | Ueda et al. .......... 395/109 |
| 5,671,059 A | * | 9/1997 | Vincent .......... 356/402 |
| 5,708,916 A | * | 1/1998 | Mestha .......... 399/49 |
| 5,771,311 A | | 6/1998 | Arai .......... 382/162 |
| 5,809,213 A | | 9/1998 | Bhattacharjya .......... 395/106 |
| 5,877,787 A | * | 3/1999 | Edge .......... 347/19 |
| 5,903,712 A | * | 5/1999 | Wang et al. .......... 358/1.9 |

(Continued)

FOREIGN PATENT DOCUMENTS

| | | | |
|---|---|---|---|
| EP | 0 491 131 A1 | 6/1992 | ............ G01J/3/51 |
| EP | 0582997 A1 | 2/1994 | ............ H04N/1/46 |
| EP | 0 625 847 A1 | 11/1994 | ............ H04N/1/46 |
| EP | 0 811 829 A2 | 12/1997 | |
| EP | 0868074 A1 | 9/1998 | ............ H04N/1/60 |
| EP | 0 915 615 A2 | 5/1999 | ............ H04N/1/60 |
| WO | WO 97/34409 A2 | 9/1997 | |

OTHER PUBLICATIONS

Berns, R.S. "Spectral Modeling of a Dye Diffusion Thermal Transfer Printer", Journal of Electronic Imaging, vol. 2, No. 4, Oct. 1993, pp. 359–370.
U.S. Appl. No. 09/487,587, filed Jan. 19, 2000, Yao Wang et al.
U.S. Appl. No. 09/221,996, filed Dec. 29, 1998, Lingappa K. Mestha et al.
U.S. Appl. No. 10/248,387, filed Jan. 15, 2003, Lalit K. Mestha et al.
U.S. Appl. No. 09/461,042, filed Dec. 15, 1999, Lingappa K. Mestha et al.
U.S. Appl. No. 09/566,291, filed May 5, 2000, Mestha et al.
Berns, R.S.: *"Spectral modeling of a Dye Diffusion Thermal Transfer Printer"*, Journal of Electronic Imaging, vol. 2, No. 4, Oct. 1993, pp. 359–370.

*Primary Examiner*—Scott A. Rogers
(74) *Attorney, Agent, or Firm*—Oliff & Berridge, PLC

(57) ABSTRACT

Spectrally matched color outputs are obtained using data from a real-time sensor, such as, for example, a spectrophotometer on the output trays of a marking devices to determine the output spectra of a reproduced image. The output spectra of the reproduced image is compared with an output spectra of a target spectra stored in a computer memory to produce a mapping table that will spectrally match all subsequently reproduced color images in real-time. Thus, output color spectra are matched between displays and prints, scans and prints, scans and displays, or copies and prints.

28 Claims, 4 Drawing Sheets

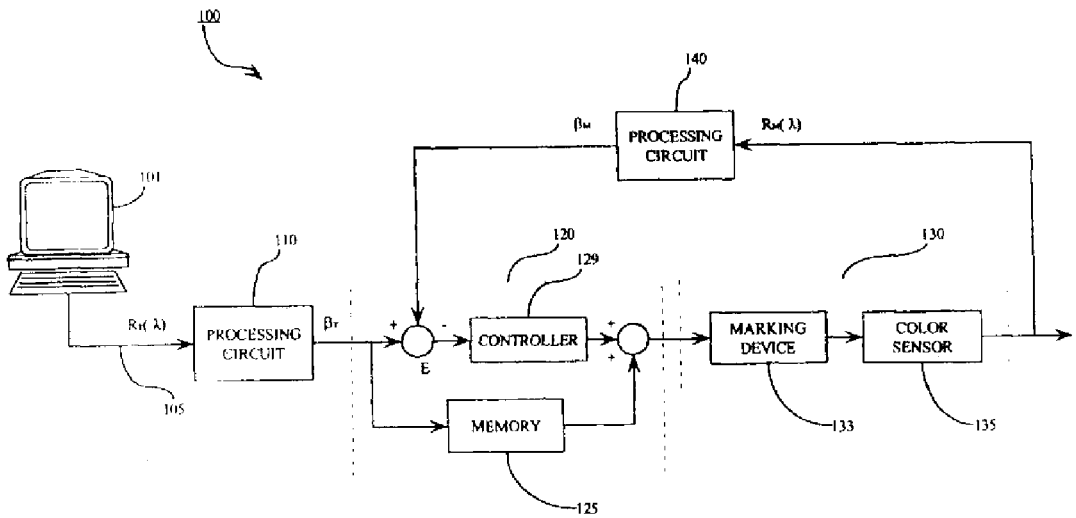

UNITED STATES PATENT AND TRADEMARK OFFICE
CERTIFICATE OF CORRECTION

PATENT NO. : 6,934,053 B1 Page 1 of 5
APPLICATION NO. : 09/487586
DATED : August 23, 2005
INVENTOR(S) : Lingappa K. Mestha and S. Dianat It is certified that error appears in the above-identified patent and that said Letters Patent is hereby corrected as shown below:

The Title Page, showing an illustrative figure, should be deleted and substitute therefor the attached title page.

Figure 1, change to the attached Figure 1;

Page 4, Figure 2, change to the attached Figure 2;

Page 5, Figure 3, change to the attached Figure 3;

Page 6, Figure 4, please delete.

This certificate supersedes the Certificate of Correction issued September 8, 2009.

Signed and Sealed this

Twenty-ninth Day of September, 2009

David J. Kappos
*Director of the United States Patent and Trademark Office*

United States Patent
Mestha et al.

(10) Patent No.: US 6,934,053 B1
(45) Date of Patent: Aug. 23, 2005

(54) METHODS FOR PRODUCING DEVICE AND ILLUMINATION INDEPENDENT COLOR REPRODUCTION

(75) Inventors: Lingappa K. Mestha, Fairport, NY (US); Sohail A. Dianat, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,586

(22) Filed: Jan. 19, 2000

(51) Int. Cl.$^7$ .................... H04N 1/56; H04N 1/60

(52) U.S. Cl. ............... 358/1.9; 358/504; 358/523

(58) Field of Search ............... 358/1.9, 518, 504, 358/523, 501, 520, 521, 406, 530; 382/167, 312

(56) References Cited

U.S. PATENT DOCUMENTS

| | | | |
|---|---|---|---|
| 4,959,669 A | | 9/1990 | Haneda et al. ............... 346/157 |
| 5,200,816 A | | 4/1993 | Rose ............................. 358/80 |
| 5,339,176 A | | 8/1994 | Smilansky et al. ........... 358/504 |
| 5,357,448 A | | 10/1994 | Stanford ........................ 364/526 |
| 5,452,111 A | * | 9/1995 | Giorgianni et al. .......... 358/504 |
| 5,481,380 A | | 1/1996 | Bestmann .................... 358/504 |
| 5,502,799 A | * | 3/1996 | Tsuji et al. ................... 345/600 |
| 5,612,902 A | * | 3/1997 | Stokes .......................... 364/526 |
| 5,664,072 A | * | 9/1997 | Ueda et al. ................... 395/109 |
| 5,671,059 A | * | 9/1997 | Vincent ........................ 356/402 |
| 5,708,916 A | * | 1/1998 | Mestha .......................... 399/49 |
| 5,771,311 A | | 6/1998 | Arai ............................. 382/162 |
| 5,809,213 A | | 9/1998 | Bhattacharjya ............. 395/106 |
| 5,877,787 A | * | 3/1999 | Edge ............................. 347/19 |
| 5,903,712 A | * | 5/1999 | Wang et al. .................. 358/1.9 |

(Continued)

FOREIGN PATENT DOCUMENTS

| | | | |
|---|---|---|---|
| EP | 0 491 131 A1 | 6/1992 | ............ G01J/3/51 |
| EP | 0582997 A1 | 2/1994 | ............ H04N/1/46 |
| EP | 0 625 847 A1 | 11/1994 | ............ H04N/1/46 |
| EP | 0 811 829 A2 | 12/1997 | |
| EP | 0868074 A1 | 9/1998 | ............ H04N/1/60 |
| EP | 0 915 615 A2 | 5/1999 | ............ H04N/1/60 |
| WO | WO 97/34409 A2 | 9/1997 | |

OTHER PUBLICATIONS

Berns, R.S. "Spectral Modeling of a Dye Diffusion Thermal Transfer Printer", Journal of Electronic Imaging, vol. 2, No. 4, Oct. 1993, pp. 359–370.

U.S. Appl. No. 09/487,587, filed Jan. 19, 2000, Yao Wang et al.

U.S. Appl. No. 09/221,996, filed Dec. 29, 1998, Lingappa K. Mestha et al.

U.S. Appl. No. 10/248,387, filed Jan. 15, 2003, Lalit K. Mestha et al.

U.S. Appl. No. 09/461,042, filed Dec. 15, 1999, Lingappa K. Mestha et al.

U.S. Appl. No. 09/566,291, filed May 5, 2000, Mestha et al.

Berns, R.S.: "*Spectral modeling of a Dye Diffusion Thermal Transfer Printer*", Journal of Electronic Imaging, vol. 2, No. 4, Oct. 1993, pp. 359–370.

*Primary Examiner*—Scott A. Rogers
(74) *Attorney, Agent, or Firm*—Oliff & Berridge, PLC

(57) ABSTRACT

Spectrally matched color outputs are obtained using data from a real-time sensor, such as, for example, a spectrophotometer on the output trays of a marking devices to determine the output spectra of a reproduced image. The output spectra of the reproduced image is compared with an output spectra of a target spectra stored in a computer memory to produce a mapping table that will spectrally match all subsequently reproduced color images in real-time. Thus, output color spectra are matched between displays and prints, scans and prints, scans and displays, or copies and prints.

28 Claims, 3 Drawing Sheets